United States Patent Office 3,541,605
Patented Nov. 17, 1970

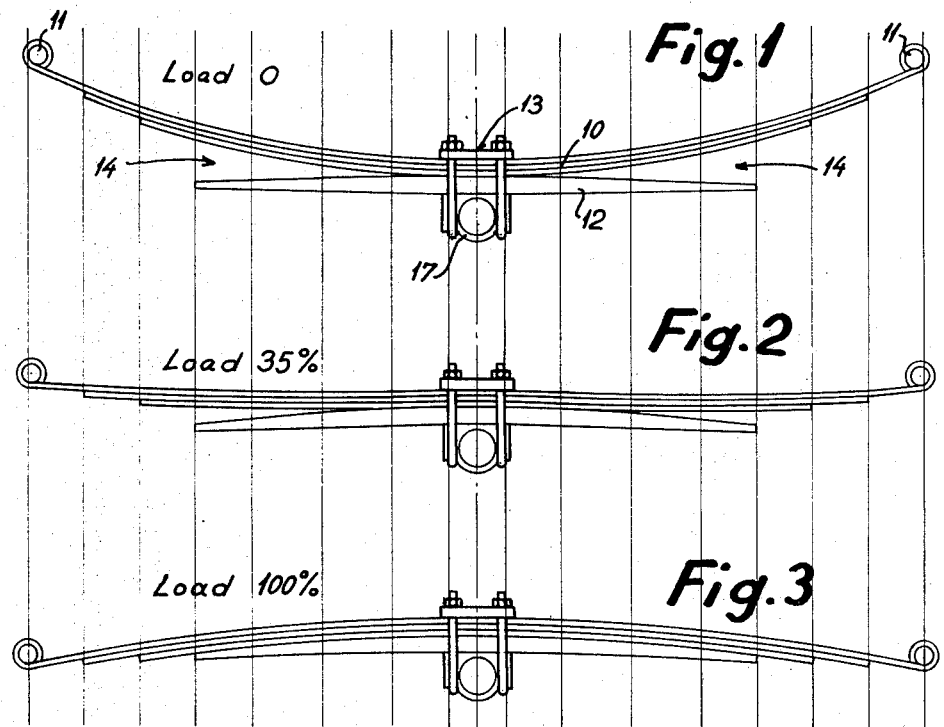
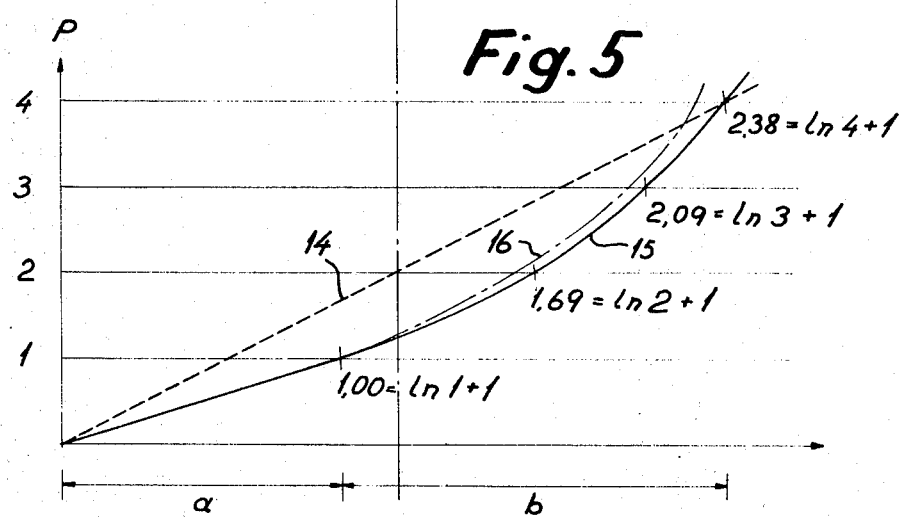

3,541,605
PROGRESSIVE LEAF SPRING ASSEMBLY
Steffen Möhl, Skodsborg Park 58,
Skodsborg, Denmark
Filed Nov. 7, 1968, Ser. No. 774,004
Claims priority, application Sweden, Nov. 8, 1967,
15,298/67
Int. Cl. B60g *11/10*
U.S. Cl. 267—47          5 Claims

ABSTRACT OF THE DISCLOSURE

A vehicle suspension spring assembly comprises a soft upper spring in the form of a packet of relatively thin spring leaves and a lower spring in the form of a single thick spring leaf. The upper and lower springs are clamped together in a point thereof and in their non-loaded state diverge from each other in a direction away from the clamping zone. The product of the modulus of elasticity of the lower spring and the moment of inertia of same in the cross section at the clamping point is at least four times as high as the sum of the corresponding products for all the spring leaves of the upper spring.

BACKGROUND OF THE INVENTION

In order to obtain a satisfactory suspension of a vehicle—by way of example a lorry—under all conditions of loading, it is well known to employ the principle of progressive spring suspension, which means that the springs are manufactured in such a manner that their assistance increases with increasing load. This is usually obtained by means of an auxiliary spring which is mounted above or below the ordinary of main spring. When the loading has reached a certain limit, the auxiliary spring goes into action in order to support and strengthen the main spring.

SUMMARY OF THE INVENTION

It is the object of the invention to provide a progressive leaf spring assembly of the type referred to, in which a particularly advantageous spring characteristic can be obtained by reliable and at the same time economic means. With this object in view, according to the invention, a vehicle suspension spring assembly comprises a soft upper spring in the form of a packet of relatively thin spring leaves and a lower spring in the form of a single thick spring leaf, said upper and lower springs being clamped together in a point thereof and in their non-loaded state diverging from each other in a direction away from said clamping zone, the product of the modulus of elasticity of the lower spring and the moment of inertia of same in the cross section at the clamping point being at least four times as high as the sum of the corresponding products for all the spring leaves of the upper spring.

BRIEF DESCRIPTION OF THE DRAWING

FIG. 1 shows a spring assembly in accordance with one embodiment of the invention, the spring assembly being shown in non-loaded condition, FIG. 2 the same spring assembly in partly loaded condition, the load corresponding to 35% of the maximum load, FIG. 3 the same spring assembly in fully loaded condition, FIG. 4 a diagram illustrating the variation of curvature of the upper side of the lower spring of the spring assembly shown in FIGS. 1–3, and FIG. 5 a diagram showing various spring characteristics.

DESCRIPTION OF THE PREFERRED EMBODIMENT

The progressive spring assembly shown in FIG. 1 comprises a soft upper spring 10, which consists of a number of comparatively thin leaves and may be provided at its ends with spring eyes 11 in the usual way, by way of example for the connection to a chassis frame, and a lower spring 12 consisting of a single thick leaf, the upper and lower springs being firmly clamped together intermediate their ends as indicated at 13. At this point the springs may be connected to a wheel carrier 17, by way of example. As a rule, the lower spring 12 has a convex curvature on its upper side, the curvature increasing steeply from the clamping point or zone 13 in both directions to reach a maximum about one third of the distance from the clamping point to the free end. This is illustrated in FIG. 4, where it will be seen that the curvature is zero both in the clamping zone 13 and adjacent the ends of the lower spring 12. When no load is applied there is a gap 14 on both sides of the clamping point 13 as illustrated in FIG. 1. When the spring is loaded, this gap will be diminished gradually, the load transfer point between the upper and lower springs being progressively displaced towards the spring end, as illustrated in FIG. 2, which corresponds to 35% of maximum load. At maximum load, the upper spring rests against the full length of the lower spring, as illustrated in FIG. 3.

According to the invention, the product of the elasticity modulus $E_u$ of the lower spring 12 and the moment of inertia $I_u$ of the spring at the cross section in the clamping point, i.e. $E_u \times I_u$, is at least four times the total sum of the corresponding products for all leaves of the upper spring 10, i.e. $\Sigma(E_0 \times I_0)$, where $E_0$ is the modulus of elasticity and $I_0$ the moment of inertia of the respective leaves of the upper spring.

This relation can be expressed mathematically as follows:

$$\frac{E_u \times I_u}{\Sigma(E_0 \times I_0)} \geq 4$$

In the diagram of FIG. 5, the ordinate represents the load on the spring, referred to as P, while the abscissa represents the deflection of the spring, referred to as $d$. The straight dotted line 14 represents the spring characteristic of a conventional leaf spring without progressiveness, the deflection of such a spring being directly proportional to the load. For the progressive spring according to the invention the spring characteristic is represented by the fully drawn curve 15. This curve has a linear initial range $a$ corresponding to deflection of the upper spring only, and a progressive range $b$ corresponding to deflection of both upper spring 10 and lower spring 12. For the deflection in this range, the following equation should be fulfilled $$d = K \times (1nP + 1)$$

if it is desired that the spring should have a constant oscillating frequency regardless of load.

By increasing the proportion $$\frac{E_u \times I_u}{\Sigma(E_0 \times I_0)}$$

to 10–15 it is possible to obtain a superprogressive characteristic within the range $b$ as illustrated by the dot-dash curve 16 in the diagram of FIG. 5. At the same time, the thick spring leaf 12 forming the lower spring may be made of a material of less bending strength.

In order to obtain the best possible economy of materials it is advantageous to construct the lower spring 12 in such a manner that its cross section decreases from the clamping point 13 towards the free ends (or towards the free end in case the spring in question has its clamping point not in the middle, but at one end and has a spring eye at the other end, as for a quarter-elliptic spring), the upper side of this spring being given such a shape in non-loaded condition that the leaves of the upper spring will be subjected over the larger part of their length to constant curvature variation when deflected to maximum load. Through this it is possible to obtain that at maximum load the greater part of both upper spring and lower spring are subjected to approximately constant bending stresses corresponding to the maximum permissible bending stress.

The invention is not limited to the special embodiment here shown and described but can be modified within the scope of the attached patent claims.

What is claimed is:

1. A vehicle suspension spring assembly comprising a soft upper spring in the form of a packet of relatively thin spring leaves and a lower spring in the form of a single thick spring leaf, said upper and lower springs being clamped together at the center thereof and in their non-loaded state diverging from each other in a direction away from said clamping zone, each end of the lowermost spring leaf in said packet extending beyond the respective ends of said lower spring so that when the spring assembly is loaded the load transfer point between said upper and lower springs is progressively displaced from said center toward said respective ends of said lower spring until said upper spring rests against the entire length of said lower spring at maximum load, and the product of the modulus of elasticity of the lower spring and the moment of inertia of same in the cross section at said center being at least four times as high as the sum of the corresponding products for all the spring leaves of the upper spring.

2. A spring assembly as in claim 1, in which the cross section of the lower spring decreases from the clamping point towards the end or ends of the spring.

3. A spring assembly as in claim 2, in which the upper surface of the lower spring is curved in such a manner that the leaves of the upper spring will be subjected over the larger part of their length to constant curvature variation when deflected to maximum load.

4. A spring assembly as in claim 2, in which the upper surface of the lower spring is curved in such a manner as to obtain a constant oscillating frequency of the spring assembly in the progressive range.

5. A spring assembly as in claim 2, in which the curvature of the upper surface of the lower spring increases steeply from the clamping point to a point about one third of the distance from the clamping point to the free end of the lower spring and then again decreases towards said free end.

References Cited

UNITED STATES PATENTS 2,861,798  11/1958  Lenet et al. _____ 267—48

JAMES B. MARBERT, Primary Examiner